US008912753B2

(12) United States Patent
Pudar et al.

(10) Patent No.: US 8,912,753 B2
(45) Date of Patent: Dec. 16, 2014

(54) REMOTE POWER USAGE MANAGEMENT FOR PLUG-IN VEHICLES

(75) Inventors: Nikola J. Pudar, Farmington Hills, MI (US); George R. Woody, Redondo Beach, CA (US); Brian A. Welchko, Torrance, CA (US); Jonas Bereisa, Bloomfield Hills, MI (US); Jonathan J. Lauckner, Oakland Township, MI (US); Anthony L. Posawatz, Davisburg, MI (US)

(73) Assignees: General Motors LLC., Detroit, MI (US); GM Global Technology Operations, LLC., Detroit, MI (US)

( * ) Notice: Subject to any disclaimer, the term of this patent is extended or adjusted under 35 U.S.C. 154(b) by 437 days.

(21) Appl. No.: 12/429,601

(22) Filed: Apr. 24, 2009

(65) Prior Publication Data
US 2009/0210357 A1    Aug. 20, 2009

Related U.S. Application Data

(63) Continuation-in-part of application No. 11/867,492, filed on Oct. 4, 2007, now Pat. No. 8,054,048, and a (Continued)

(51) Int. Cl.
*H02J 7/00*    (2006.01)
*B60L 11/18*    (2006.01)

(Continued)

(52) U.S. Cl.
CPC ......... *B60L 11/1842* (2013.01); *B60L 11/1816* (2013.01); *B60L 11/184* (2013.01); *B60L*

(Continued)

(58) Field of Classification Search
USPC .................................................. 320/109, 111
See application file for complete search history.

(56) References Cited

U.S. PATENT DOCUMENTS 5,642,270 A    6/1997    Green et al.
5,903,064 A    5/1999    Norberg (Continued)

OTHER PUBLICATIONS

Harper, P., Edison SmartConnect: The Path Forward. Daily Issue Alert 2008 [retrieved on Aug. 28, 2008]. Retrieved from Internet <URL:http://www.energyblogweb.com/issuealert/article.asp?id=2965&Print=True>.

(Continued)

*Primary Examiner* — Edward Tso
*Assistant Examiner* — Robert Grant
(74) *Attorney, Agent, or Firm* — Leydig, Voit & Mayer, Ltd.

(57) ABSTRACT

Methods and systems are provided for controlling the charging of onboard energy storage systems of a plurality of plug-in vehicles using a remote command center. A system for directing the charging of a plurality of remotely located plug-in vehicles is provided. The system includes a communication system configured to transmit charging authorizations to charge each of the plurality of plug-in vehicles and to receive data related to power consumption from each of the plurality of plug-in vehicles. The system also includes a controller communicatively coupled to the communication system and configured to receive the data related to power consumption and to direct the charge authorizations based thereon. A database is also included in the system and is communicatively coupled to the controller, with the database configured to store the data related to power consumption.

19 Claims, 6 Drawing Sheets

Related U.S. Application Data continuation-in-part of application No. 12/349,336, filed on Jan. 6, 2009.

(60) Provisional application No. 61/144,009, filed on Jan. 12, 2009.

(51) Int. Cl.
  *G06Q 50/06* (2012.01)
  *H02J 3/00* (2006.01)
  *H02J 13/00* (2006.01)

(52) U.S. Cl.
  CPC . 11/1844 (2013.01); *B60L 11/1846* (2013.01); *G06Q 50/06* (2013.01); *H02J 3/008* (2013.01); *H02J 7/0027* (2013.01); *H02J 13/0062* (2013.01); *B60L 2240/62* (2013.01); *B60W 2550/402* (2013.01); *Y02B 70/3216* (2013.01); *Y02B 90/2638* (2013.01); *Y02E 60/721* (2013.01); *Y02T 10/6269* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 20/221* (2013.01); *Y04S 30/14* (2013.01); *Y04S 40/124* (2013.01); *Y04S 50/10* (2013.01)
  USPC .......................................... 320/109; 320/111

(56) References Cited

U.S. PATENT DOCUMENTS

| | | | |
|---|---|---|---|
| 6,614,204 B2* | 9/2003 | Pellegrino et al. | 320/109 |
| 2007/0282495 A1* | 12/2007 | Kempton et al. | 701/22 |
| 2008/0039989 A1* | 2/2008 | Pollack et al. | 701/22 |
| 2008/0041648 A1* | 2/2008 | Gardner | 180/65.2 |
| 2008/0203973 A1* | 8/2008 | Gale et al. | 320/157 |
| 2009/0091291 A1 | 4/2009 | Woody et al. | |

OTHER PUBLICATIONS

Tendril Volt. Plug in to what's Plugged-In. 2008 [retrieved on Aug. 28, 2008]. Retrieved from Internet <URL:http://www.tendrilinc.com/consumers/products/volt/>.

ZigBee Alliance Smart Energy Certified Products. 2008 [retrieved on Aug. 28, 2008]. Retrieved from Internet <URL:http://www.zigbee.org/en/certification/certified_products_zse.asp>.

Southern California Edison. Advanced Metering Infrastructure. Southern California Edison 2006. [Retrieved on Aug. 28, 2008]. Retrieved from Internet <URL:http://www.sce.com/ami>.

Designing the Future: A Smart Grid Newsletter Case Study, Nov. 2006. [Retrieved on Aug. 28, 2008]. Retrieved from Internet <URL:http://www.smartgridnews.com>.

Southern California Edison. Testimony supporting application for approval of advanced metering infrastructure pre-deployment activities and cost recovery mechanism, Dec. 21, 2006. Obtained on Aug. 28, 2008, vol. 1.

Coulomb Technologies, Inc. "The ChargePoint Network as a Platform for Advanced Services," [Retrieved on Apr. 14, 2009]. Retrieved from Internet: <URL: http://chargepoint.fatcow.com/library/chargepoint_datasheet.php>.

Coulomb Technologies, Inc. "ChargePoint Network Operating System," [Retrieved on Apr. 14, 2009]. Retrieved from Internet: <URL: http://chargepoint.fatcow.com/library/NOS_datasheet.php>.

Coulomb Technologies, Inc. "Smartlet Networked Charging Stations," [Retrieved on Apr. 14, 2009]. Retrieved from Internet: <URL: http://chargepoint.fatcow.com/library/smartlet_datasheet.php>.

Coulomb Technologies, Inc. "Plug-In Vehicles: Taking Charge of an Enabling Infrastructure," Jul. 2008, pp. 1-4. [Retrieved on Apr. 14, 2009]. Retrieved from Internet: <URL: http://www.coulombtech.com/library/PPHEVCI-final.pdf>.

* cited by examiner

REMOTE POWER USAGE MANAGEMENT FOR PLUG-IN VEHICLES

CROSS-REFERENCE TO RELATED APPLICATIONS

This application is a continuation-in-part from pending U.S. non-provisional application Ser. No. 11/867,492 filed Oct. 4, 2007, which is incorporated in this application by reference; and is also a continuation-in-part from pending U.S. non-provisional application Ser. No. 12/349,336 filed Jan. 6, 2009 which is incorporated in this application by reference; this application also claims priority to U.S. provisional application Ser. No. 61/144,009 filed Jan. 12, 2009 which is incorporated in this application by reference.

TECHNICAL FIELD

The subject matter described in this application generally relates to systems and methodologies for charging plug-in electric vehicles such as hybrid electric vehicles. More particularly, the subject matter described relates to systems and methods for management, billing, and/or controlling of the charging of onboard energy storage systems of plug-in vehicles at various remote locations.

BACKGROUND

Plug-in hybrid electric, plug-in fully electric and other fuel efficient vehicles are becoming increasingly popular. These vehicles are known as plug-in vehicles because onboard energy storage systems (e.g., battery packs) are recharged from a power source such as a utility power source by connecting (plugging in) the vehicle to an outlet. In contrast to many of the conventional hybrid electric vehicles presently on the market, a plug-in hybrid vehicle can often use its onboard energy storage system as the primary propulsion system for an extended range (up to 50 miles in some cases).

In a typical charging situation, a vehicle charger is connected to the local power grid at a home location or the like and the onboard energy storage system is charged from the local power grid. The range of some electric and hybrid electric vehicles charged from the local power grid is suitable for daily commutes. In some situations, however, the range of the electric vehicle is not suitable to reach a destination and to return home using only the charge from the local utility company. That is, it may be desirable to charge the vehicle at locations other than the driver's home or other base location, and additional methods of charging electric vehicles are needed to extend the range of vehicles utilizing onboard energy storage systems. Additional systems and methods of billing are also needed for the power consumed to charge the vehicle at a remote location.

BRIEF SUMMARY

A system for directing the charging of a plurality of remotely located plug-in vehicles is provided. The system includes a communication system configured to transmit charging authorizations to charge each of the plurality of plug-in vehicles and to receive data related to power consumption from each of the plurality of plug-in vehicles. The system also includes a controller communicatively coupled to the communication system and configured to receive the data related to power consumption and to direct the charge authorizations based thereon. A database is also included in the system and is communicatively coupled to the controller, with the database configured to store the data related to power consumption.

A charging system configured to charge a battery in a plug-in vehicle is also provided. This system includes a sensor configured to sense electric power received from a utility power source used to charge the battery. A data storage device is also included, and is communicatively coupled to the sensor, the data storage device is configured to store data related to the electric power. The system also includes a communication system communicatively coupled to the data storage device and configured to transmit the data related to the electric power to a remote command center.

A method of charging a plurality of onboard energy storage systems of a plurality of plug-in vehicles is provided. The method involves: transmitting charge authorizations to charge the plurality of onboard energy storage systems; receiving, from the plurality of plug-in vehicles, data related to power consumption during the charging of each of the plurality of onboard energy storage systems according to the charge authorizations; and storing the data related to the power consumption.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment will be described in conjunction with the following drawing figures, where like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In many cases a plug-in vehicle (hybrid or all electric) provides relatively high efficiency with reduced adverse environmental impact when the vehicle is operated primarily from an onboard energy storage system that is recharged from a utility power source. One limitation, however, on the use of the onboard energy storage systems is the range of use between charges. Presently there are limited opportunities to recharge the onboard energy storage system away from a home. If a vehicle is charged away from home, for example, then a second party may be paying the electric bill for charging the vehicle. The vehicle owner could enter into a contract with the second party to pay for the costs of charging the vehicle, but in most cases the power usage tracking is not in place to support this transaction.

One solution to the challenge of charging a vehicle away from home is for a remote command center to gather information from the vehicle so that a complete charging and financial transaction can take place regardless of the location of the vehicle. Either the vehicle and/or a charger can measure and record power used to charge the onboard energy storage system and then transmit data to the remote command center. The remote command center may also communicate with a power company to credit the power meter where the vehicle is charged for power used to charge the vehicle. In the exemplary solution, the remote command center allows a vehicle owner to conveniently charge the onboard energy storage system at multiple locations, thereby extending the usable range of the plug-in vehicle.

Figure 1:
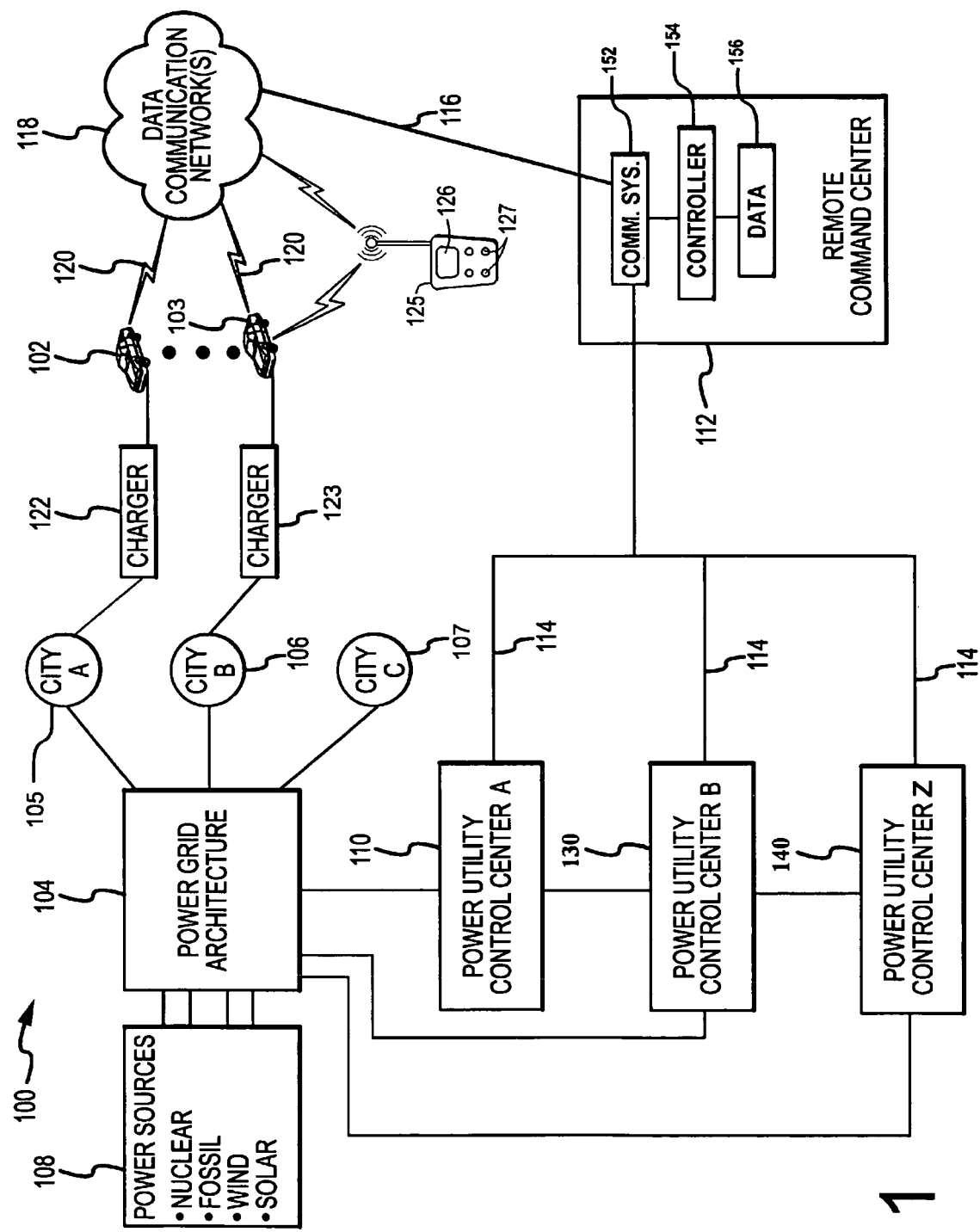
FIG. 1 is a simplified schematic diagram of an embodiment of a system for controlling the charging of onboard energy storage systems of plug-in vehicles.

In FIG. 1 an exemplary system 100 for controlling the charging of onboard energy storage systems of plug-in vehicles 102 and 103 is shown including a remote command center 112 that is in communication with power utility control centers (110, 130, and 140), and in communication with plug-in vehicles 102 and 103. In the exemplary embodiment remote command center 112 includes a communication system 152, a controller 154 and a database 156. Communication between plug-in vehicles (102 and 103) and remote command center 112 may be through a data communication network 118 with data communication links 120 connecting plug-in vehicles 102 and 103 to the data communication network 118. In the exemplary embodiment a link 116 connects data communication network 118 to remote command center 112. A user input device 125 can communicate with data communication network 118 or plug-in vehicle 103 to input parameters for charging the onboard energy storage systems.

FIG. 1 also represents a geographical area supported by a power grid architecture 104 that is configured and designed for the delivery of electrical energy, where the geographical area can be of any practical size. For this example, the illustrated geographical area includes one or more cities including city A 105, city B 106, and city C 107. The geographical area may have power controlled by multiple utility power companies. In an exemplary embodiment city A 105 receives power controlled by a first power utility company that operates power utility control center A 110, city B 106 receives power controlled by a second power utility company that operates power utility control center B 130, and city C receives power controlled by a third power utility company that operates power utility control center Z 140. A first vehicle 102 and a second vehicle 103 may be charged at multiple locations. A first charger 122 may be connected at first location such as a residence in city A 105, and a second charger 123 may be connected at a second location such as an office in city B 106. In the exemplary embodiment plug-in vehicles 102 and 103 may be charged with first charger 122 and/or with second charger 123, and the related financial transactions for power usage may be linked to a specific vehicle profile or account, rather than linked to the location of the charger.

Power grid architecture 104 represents the systems, infrastructure, power lines, transformers, power distribution equipment, control systems, and other components that are used to provide power to cities 105, 106 and 107. In this regard, power grid architecture 104 obtains energy from one or more power sources 108. Power sources 108 may include any number of different energy generation sources, including, without limitation: nuclear sources; fossil fuel sources; wind power generators; hydroelectric; or solar power generators. Using any suitable techniques and technologies, power grid architecture 104 processes and distributes power from power sources 108 as needed throughout cities 105, 106, and 107. In an exemplary embodiment power grid architecture 104 is managed by several power utility companies which maintain multiple power utility control centers 110, 130 and 140. In practice, power utility control centers 110, 130, and 140 may be included within power grid architecture 104 itself.

Power utility control centers A-Z 110, 130, and 140 are suitably configured to manage, regulate, and otherwise control the operation of power grid architecture 104. As described in more detail below, power utility control centers 110, 130 and 140 may be coupled to a remote command center 112 to facilitate data communication that supports plug-in vehicle charging techniques as well as financial transactions associated with charging.

Remote command center 112 may be a central control center for communication with multiple power utility companies as shown in the exemplary embodiment of FIG. 1. In other embodiments remote command center 112 is located at multiple locations and may communicate in a centralized and/or a decentralized communication system. In FIG. 1, links 114 represent one or more wireless and/or wired data communication links between communication system 152 in remote command center 112 and power utility control centers 110, 130, and 140. Link 114 facilitates data communication in accordance with any number of known wired and/or wireless data communication protocols. Controller 154 in remote command center 112, may regulate the charging of multiple vehicles at the same time, as well as storing data related to the charging for each vehicle in database 156. In an exemplary embodiment, controller 154 receives a charge request from first vehicle 102 indicating a specific location in city A 105. As part of charging authorization in this example, controller 154 directs communication system 152 to contact power utility control center A 110 indicating the location for the charge. When a charge is authorized by power utility control center A 110, controller 154 sends a message to charger 122 to begin charging first vehicle 102. While charging, charger 122 measures the power consumed. During the charge and/or when the charge is complete for first vehicle 102 in this example, the amount of power consumed is transmitted to the remote command center, and stored in database 156. In the exemplary embodiment the amount of power used is also transmitted from the remote command center 112 to power utility control center A, to credit the specific power meter at the location where first vehicle 102 was charged.

In an exemplary embodiment remote command center 112 acts as a central control of the charging process, and each plug-in vehicle 102 and 103 has local control of the charging control process. Each vehicle 102 and 103, for example, may maintain a charging profile that has rules for charging the onboard energy storage system based on input from remote command center and input from a vehicle operator through user input device 125. The rules for charging may be based on data specific to each location, with the user input applied to each specific location, and the same rules applied each time plug-in vehicle is charged at the specific location. Default rules may also be established for those locations without associated input from the vehicle operator. The parameters for charging an onboard energy storage system at a specific location may limit charging based on time, costs, peak power usage, and other factors. User input device 125 can be used to modify the rules, for example, by temporarily overriding the charging rules and directing a full charge to begin immediately.

User input device 125 is any device that is configured to accept input from a vehicle operator. In one embodiment user input device 125 is configured for wireless communication with data communication system 214. User input device 125, for example, may receive and transmit a short range radio frequency band signal, although other types of wireless communication may also be used. User input device 125 may have a display 126 that indicates communication from data communication system 214 and/or status of plug-in vehicle 103. In the exemplary embodiment user input device 125 includes input keys 127 that are used to operate user input device 125 and/or to input commands to be sent to plug-in vehicle 103, such as remote operation of doors, pre-conditioning the onboard energy storage system in cold weather, and other vehicle settings or features. User input device 125 communicates with plug-in vehicle 103, and may also be used to communicate with data communication networks 118, charger 123 or other systems. In an exemplary embodiment, user input device 125 is used to identify a specific driver of plug-in vehicle 103. In various embodiments, user input device 125 is any sort of computing device, PDA, cell phone, key fob, PC computer, laptop, or other electronic device that is capable of performing the features described in this application. User input device 125 may be used to input parameters and adjust charging of plug-in vehicle 103 from any location regardless of the distance to vehicle 103, for example, when user input device 125 communicates through data communication network 118.

In one embodiment charger 122 is located in a fixed location. In this case charger 122 contains location data including the specific power meter where charger 122 is connected. Charger 122 may transfer the location and meter information to plug-in vehicle 102 when the charger is connected for charging. After the information is transferred, the vehicle charging system may communicate with the remote command center regarding the specific power meter and/or specific utility power company supplying power.

System 100 may also cooperate with GPS satellites (not shown) or other positioning systems that provide raw location data. Onboard GPS systems, for example, may be located in plug-in vehicles 102 and 103 to receive location data for use with an onboard navigation system. In addition, the exemplary onboard GPS systems provide the raw location data (and/or processed vehicle location data derived from the raw location data) to remote command center 112 via data communication network(s) 118. Controller 154 in remote command center 112 uses the location data to determine the utility company in any suitable manner. Database 156, for example, may contain mapping information that is correlated to power grid supply for multiple utility companies. In the exemplary embodiment controller 154 plots the location data using the mapping information to determine the utility company supplying power. Remote command center 112 may further utilize the vehicle location data to support the plug-in vehicle charging techniques described in more detail below.

System 100 may include any number of chargers 122 and 123 coupled to power grid architecture 104. Although depicted as a distinct component in the exemplary embodiment, charger 122 may instead be integrated into a plug-in vehicle 102, or integrated into another structure such as a building or a vehicle charging station. Chargers 122 and 123 are suitably configured to provide charging energy from power grid architecture 104 to the onboard energy storage systems of plug-in vehicles 102 and 103. Notably, remote command center 112 is configured to remotely regulate charging of the onboard storage systems of plug-in vehicles 102 and 103 by chargers 122 and 123.

In an exemplary embodiment first charger 122 is linked to a first geographic location and second charger 123 is linked to a second geographic location. First charger 122 and second charger 123 may receive power from different utility companies with different utility rates. Remote command center 112 may be configured to receive usage data from a vehicle such as first vehicle 102 when charging at various locations. In the exemplary embodiment remote command center 112 communicates with the different utility companies, translates data into appropriate formats to facilitate vehicle charging, and facilitates financial transactions associated with vehicle charging. In this manner billing for power used to charge vehicle 102 may be from the remote command center 112 rather than from the different utility companies.

Figure 2:
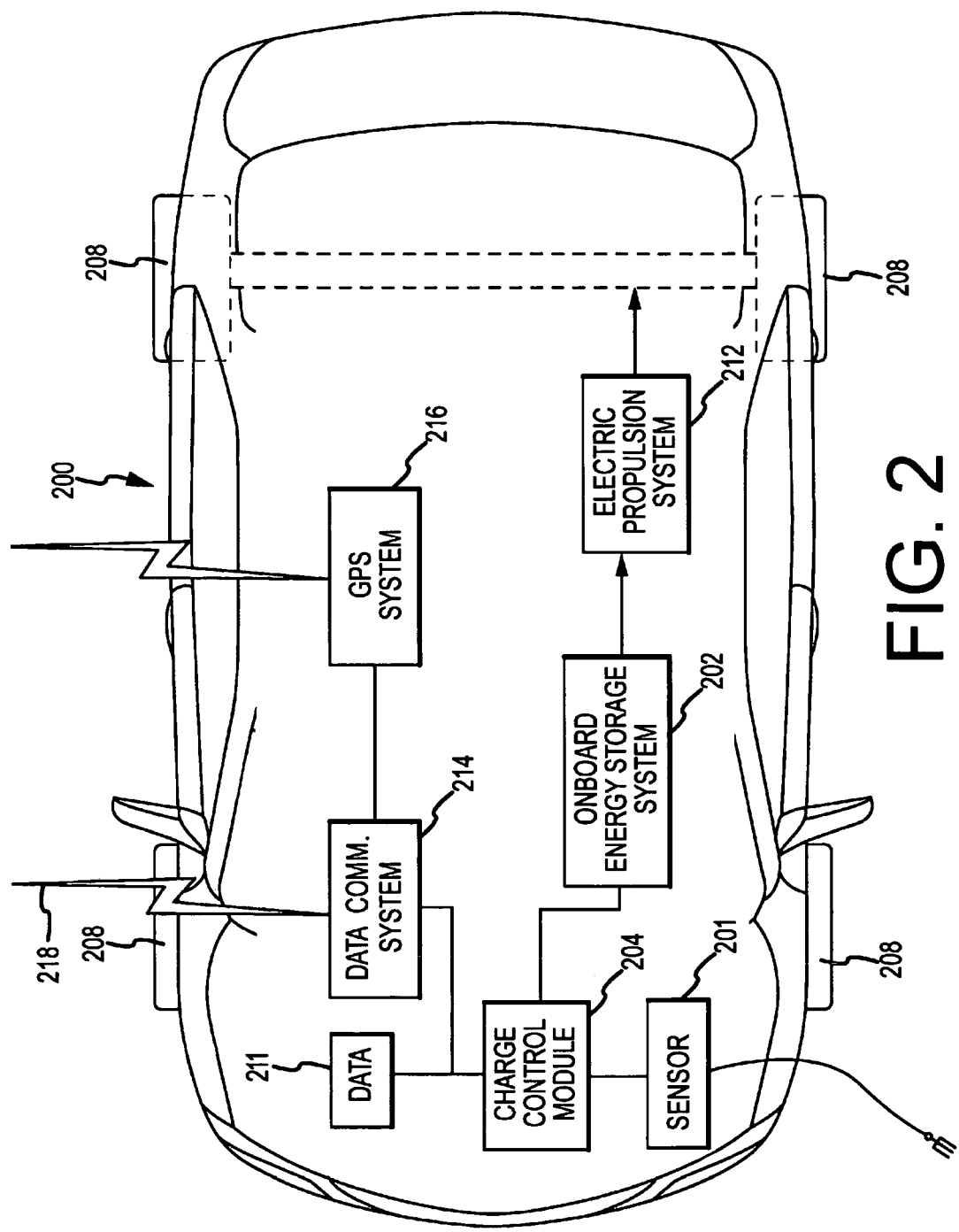
FIG. 2 is a simplified schematic representation of an embodiment of a plug-in vehicle that is suitable for use in the system shown in FIG. 1.

FIG. 2 is a simplified schematic representation of an embodiment of a plug-in vehicle 200 that is suitable for use in system 100. Indeed, each plug-in vehicle (102 and 103) may include the components depicted in FIG. 2. Plug-in vehicle 200 is a purely electric vehicle; the charging techniques and concepts described here, however, are also applicable to a hybrid electric plug-in vehicle or a range extended electric vehicle. The illustrated embodiment of plug-in vehicle 200 includes, without limitation: a sensor 201; an onboard energy storage system 202; a charge control module 204 coupled to onboard energy storage system 202; wheels 208; a data storage device 211 coupled to charge control module 204; an electric propulsion system 212 coupled to onboard energy storage system 202; an onboard data communication system 214 coupled to charge control module 204; and an onboard GPS system 216 coupled to onboard data communication system 214. Electronic devices, electronic control modules, and processing components of plug-in vehicle 200 may be coupled together using a data communication bus, conductive elements, and/or any suitably configured interconnection architecture. FIG. 2 is a schematic diagram that depicts various electrical and mechanical connections and couplings in a very simplified manner for ease of description. An embodiment of plug-in vehicle 200 will of course utilize additional physical components and devices that are well known in the automotive industry.

Plug-in vehicle 200 may communicate with remote command center 112 using a vehicle data communication system 214 such as the ONSTAR® communication system or the like. In practice, data communication system 214 might leverage a cellular or other wireless telephone system based upon satellite and/or terrestrial wireless infrastructure. Similarly, many modern cell phones now use GPS or other location-based features. These features may allow utility companies to locate the vehicle's electrical connection to the power grid and to determine charge command information needed for load leveling. The location information may also be used to determine billing information for billing a person associated with the vehicle as described in greater detail below. Conversely, the location-based feature can help the user find where to charge the vehicle, such as a public charging station in a public parking area. Both the vehicle based data communication system 214 and/or portable cell phones or other wireless technologies can be used to deploy the embodiments described in this application. Data communication system 214 may be incorporated into plug-in vehicle 200, or may be part of charger 122 (FIG. 1). Alternatively, data communication system 214 may be a separate unit.

In an exemplary embodiment, sensor 201 and onboard charge control module 204 are used to measure power consumption for billing purposes. An embodiment of the system links data communication system 214 with onboard electrical energy storage system 202 of plug-in vehicle 200. More specifically, the system allows data communication system 214 to communicate with onboard charge control module 204 to process logic that regulates the charging of onboard energy storage system 202. Information is stored in data storage device 211, including the power consumed, the state of charge (SOC) and/or state of health (SOH) of a battery cell or a battery pack, and can be sent to the onboard data communication system 214 using the onboard data communication bus or architecture. Onboard data communication system 214 can then send the data related to power consumption, SOC/SOH data, vehicle location data, and other data to remote command center 112 (FIG. 1) to facilitate charging and financial transactions associated with charging.

In an exemplary embodiment, authorization to charge onboard energy storage system 202 at a specific location (such as at a restaurant or hotel) comes from remote command center 112 (FIG. 1) through onboard data communication system 214. Sensor 201 may measure the power used to charge onboard energy storage system 202 so that charge control module 204 can determine the power consumed during charging and store data in data storage device 211. In the exemplary embodiment, when charging is complete, charge control module 204 directs onboard data communication system 214 to transmit data related to power consumed to remote command center 112. Remote command center 112 may then complete financial transactions related to charging at the specific location.

Onboard energy storage system 202 may be realized as a rechargeable battery pack having a single battery module or any number of individual battery modules. Onboard energy storage system 202 provides electrical energy that enables electric propulsion system 212 to provide traction power to wheels 208. Control module in plug-in vehicle 200, including charge control module 204, may include any type of processing element or vehicle controller, and it can be equipped with nonvolatile memory, random access memory (RAM), discrete and analog input/output (I/O), a central processing unit, and/or communications interfaces for networking within an automotive communications network. Moreover, the steps of a method or algorithm described in connection with the embodiments disclosed may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. In the alternative, the storage medium may be integral to the processor. As an example, the processor and the storage medium may reside in an ASIC.

Figure 3:
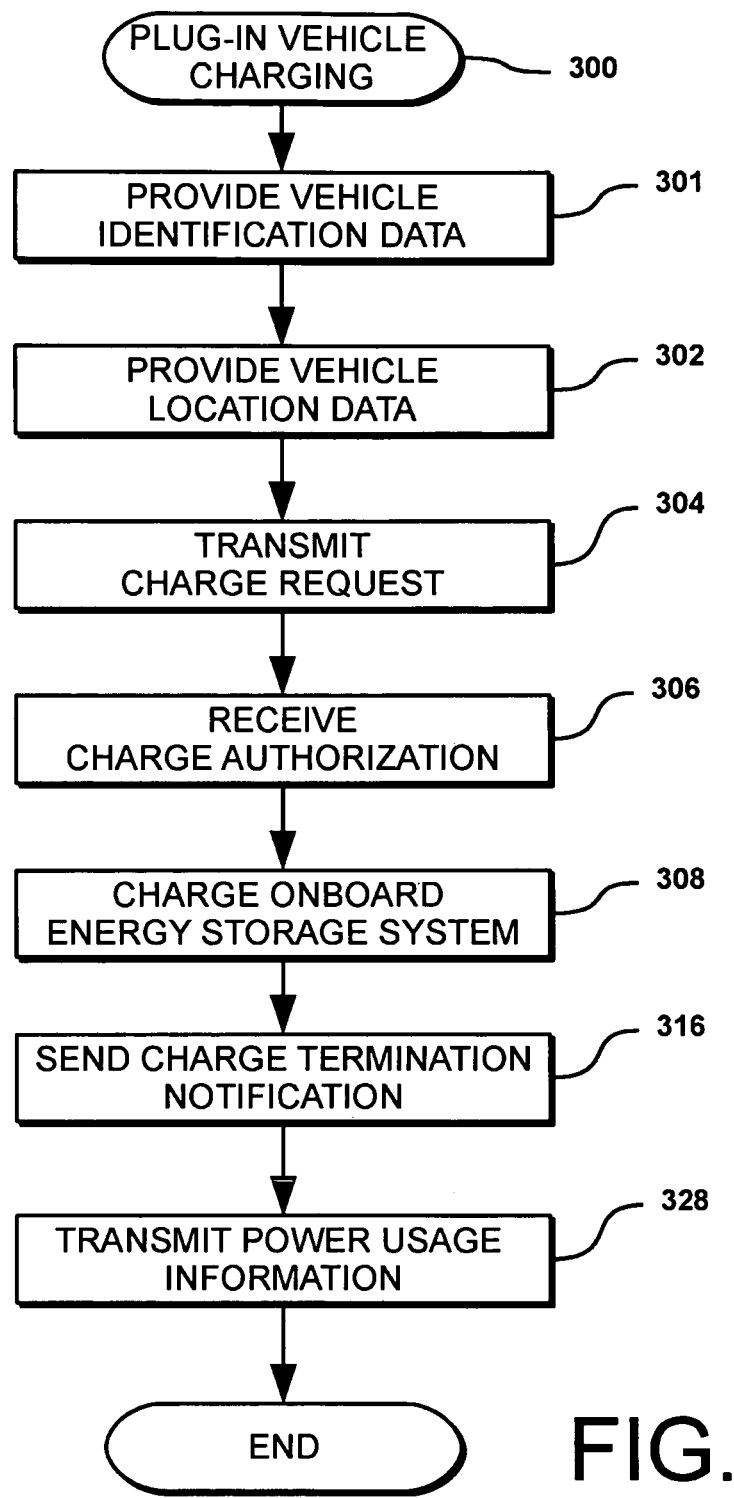
FIG. 3 is a flow chart that depicts an embodiment of a plug-in vehicle charging process.
Figure 4:
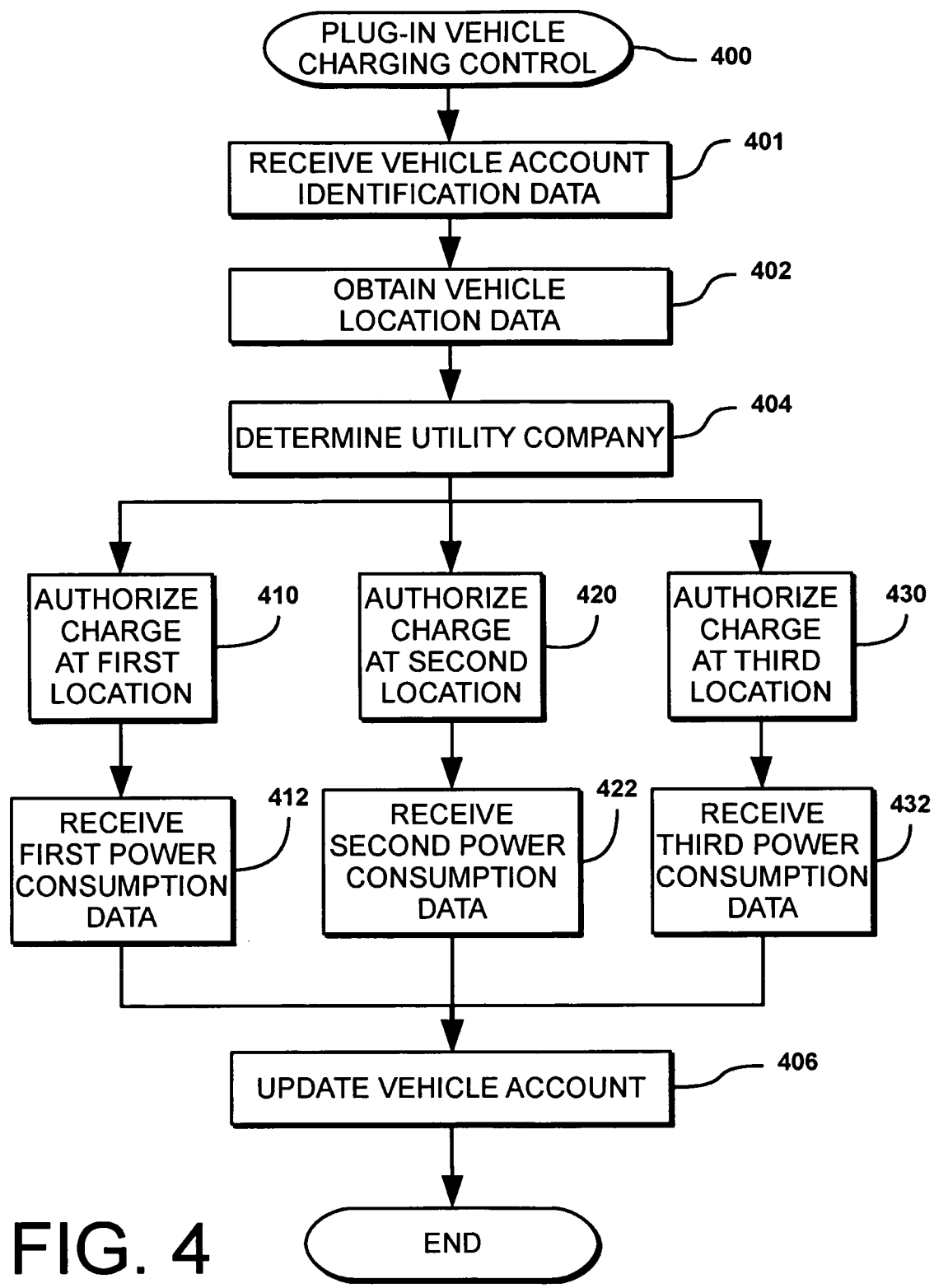
FIG. 4 is a flow chart that depicts an embodiment of a plug-in vehicle charging control process.

Components of plug-in vehicle 200 cooperate to support the charging techniques and methodologies described. In this regard, FIG. 3 is a flow chart that depicts an embodiment of a plug-in vehicle charging process 300, which may be performed by plug-in vehicles 102/200, and FIG. 4 is a flow chart that depicts an embodiment of a plug-in vehicle charging control process 400, which may be performed by remote command center 112 and/or one or more of the power utility control centers (110, 130, and/or 140). The various tasks performed in connection with these processes may be performed by software, hardware, firmware, or any combination thereof. For illustrative purposes, the following description of these processes may refer to elements mentioned above in connection with FIG. 1 or FIG. 2. In practice, portions of these processes may be performed by different elements of the described system. It should be appreciated that a given process may include any number of additional or alternative tasks, the tasks shown in FIG. 3 and FIG. 4 need not be performed in the illustrated order, and a given process may be incorporated into a more comprehensive procedure or process having additional functionality not described in detail. Although process 300 and process 400 describe communication between a single vehicle and remote command center 112 (FIG. 1), multiple vehicles may communicate with remote command center at the same time for the purpose of charging multiple onboard energy storage systems 202 (FIG. 2). As described above, the onboard data communication system of the plug-in vehicle may receive or generate vehicle location data that indicates the location of the plug-in vehicle. In exemplary embodiments, the vehicle location data represents the present position of the plug-in vehicle as derived from GPS data or other suitable methods.

Turning now to FIG. 3, an exemplary process 300 for charging a plug-in vehicle suitably includes the broad tasks of providing vehicle location data (task 302) to remote command center 112 (FIG. 1), transmitting a charge request (task 304), receiving charge authorization (task 306) and transmitting power usage information (task 328). Other embodiments may additionally provide vehicle identification data (task 301) to remote command center 112, charge the onboard energy storage system (task 308) according to the charge authorization, and send a charge termination notification (task 316) to remote command center 112 when charging is complete or terminated. Various other tasks or functions and other features may also be provided as described in increasing detail below.

In the exemplary embodiment, process 300 begins with the plug-in vehicle already connected to a charger, or with an onboard charging system connected to a wall outlet that supplies utility power. Plug-in vehicle provides vehicle identification data (task 301) to remote command center 112 (FIG. 1) in any suitable manner. In one embodiment the vehicle identification data includes identification of a specific vehicle driver. For example, a vehicle may have multiple drivers, and each driver may be identified by individual key fobs. One of the key fobs may be used to initiate a charging process and the key fob transmits the driver specific information to the vehicle. In the exemplary embodiment the driver specific information is transmitted along with vehicle specific information to remote command center 112. In other embodiment only vehicle specific information is sent to remote command center 112, such as a vehicle identification number, or other vehicle specific information, that allows the remote command center to identify a specific account and/or user profile stored in database 156 accessible by remote command center 112. The transmission of the vehicle identification data may be encrypted, as the vehicle identification data may be used as part of the financial transaction for charging the onboard energy storage system.

The plug-in vehicle provides the vehicle location data (task 302) to remote command center 112 (FIG. 1) in any suitable manner. In one embodiment the location data is data received from onboard GPS system 216 (FIG. 2) and transmitted to remote command center 112. Location data may also be obtained from cell towers or other systems that provide general and/or specific location data. In one embodiment the location data includes information input by a user, such as a destination location used with a navigation system or service. The location data may be processed by charge control module 204 in plug-in vehicle 200 and/or by controller 154 in remote command center 112. Plug-in vehicle 200, for example, may have location mapping and/or tracking software that uses GPS data, directional data from a compass, and/or odometer data to track the specific location of the vehicle, and transmit the specific location to remote command center 112. In another embodiment plug-in vehicle 200 communicates with a device at the charging location that identifies the location. An advanced charging meter, for example, may have a communication system that communicates with plug-in vehicle 200 and identifies the specific location and/or the specific meter.

In an exemplary embodiment, process 300 initiates the charging procedure by transmitting a charge request (task 304) to remote command center 112 (FIG. 1). Remote command center is associated with plug-in vehicle 200 (FIG. 2) (for example, one to which the plug-in vehicle owner has subscribed) and has an account and/or a user profile associated with plug in vehicle 200. The charge request may be included with the transmission of the vehicle identification data (task 301) and the location data (task 302) or may be in a separate communication between plug-in vehicle 200 and remote command center 112. The charge request may be conveyed during a cellular network call established between onboard data communication system 214 and communication system 152 in remote command center 112. The charge request can convey data indicative of various information. For example, the charge request may convey any of the following items, without limitation: an identifier of the plug-in vehicle; the name of the driver; the name of the owner; the vehicle location data; utility meter data; power utility company identification; SOC data that indicates the SOC of the onboard energy storage system; SOH data that indicates the SOH of the onboard energy storage system; the time; an anticipated window of time during which the plug-in vehicle will remain plugged in; priority data that indicates a relative charging priority for the plug-in vehicle (e.g., "charge immediately," or "charge within the next 60 minutes," or "charge whenever possible"); or the charge capability indicating the amount of energy the system can accept and/or the rate at which it can be charged. The charge request may specify, or be used to determine if any portion of the power stored in the onboard energy storage system is available as a backup power source. The charge request, for example, may also enable a portion of power to be drawn from the vehicle onboard energy storage system for use to balance peak loads on the grid, or as battery backup for essential systems in a home or business.

In the exemplary embodiment, remote command center 112 (FIG. 1) receives and processes the charge request, and transmits a charge authorization. Plug-in vehicle 200 (FIG. 2) may receive the charge authorization (task 306) from remote command center 112, where this charge authorization is received in response to the charge request transmitted during task 304. Thereafter, process 300 regulates charging of the onboard energy storage system (task 308) in accordance with the received charge authorization. The charge authorization may be multiple communications that direct charge control module 204 to start and stop charging onboard energy storage system 202, and/or to reduce or increase the rate of charge. In this manner remote command center 112 can regulate charging to manage peak loads on power grid 104, reduce the cost of charging onboard energy storage system 202, and perform other useful functions related to charging multiple plug-in vehicles.

A charge termination notification may be sent to remote command center 112 (FIG. 1) to inform remote command center 112 of the fully charged state or of the disconnected state of the plug-in vehicle (task 316).

In the exemplary embodiment, plug-in vehicle 200 (FIG. 2) transmits power usage information (task 328) to remote command center 112 (FIG. 1) in any suitable manner. Power usage information may be measured by plug-in vehicle 200 using sensor 201 and stored with other information such as the time of the power usage. In other embodiments power usage may be tracked by an external sensor or meter that communicates with plug-in vehicle. Power usage information can be used to bill an account associated with the plug-in vehicle and/or a user profile for the power used to charge onboard energy storage system 202.

Power usage information may be transmitted to command center during the charging process, with a final power usage transmission (task 328) transmitted as part of the charge termination notification (task 316). The power usage information may also be stored as data in a data storage device 211 (FIG. 2) on plug-in vehicle 200 and transmitted at a later time. The power usage data may be stored, for example, when communication between vehicle and command center is limited or for other reasons.

Turning now to FIG. 4, from the perspective of the remote command center, exemplary process 400 for charging plug-in vehicle 200 (FIG. 2) suitably includes the broad tasks of authorizing charging of onboard energy storage system 202 (tasks 410, 420 and 430), receiving power consumption data (tasks 412, 422, and 432) from plug-in vehicle 200, and updating a vehicle account (task 406) in database 156 (FIG. 1) of remote command center 112. Other embodiments may additionally receive vehicle account identification data (task 401), obtain vehicle location data (task 402), and determine utility company (task 404) associated with the charging location. Various other tasks or functions and other features may also be provided as described in increasing detail below.

In the exemplary embodiment remote command center 112 (FIG. 1) receives vehicle account identification data (task 401) in any suitable manner. Remote command center 112, for example, may communicate with plug-in vehicle 200 (FIG. 2) through data communication system 214 and communication system 152. Exemplary database 156 is linked to remote command center and stores multiple accounts associated with multiple vehicles. Accounts stored in database 156 may be associated with individuals and/or vehicles. In the exemplary embodiment a vehicle account is debited for transactions and services that are delivered through remote command center 112, such as navigation services, concierge service, vehicle diagnostics services, emergency dispatch service, theft deterrence and vehicle location service, and other services. The vehicle account may also be debited for the cost of charging plug-in vehicle 200 at remote locations. A vehicle owner is suitably billed on a regular basis for the account balance.

The cost of charging plug-in vehicle 200 (FIG. 2) at a remote location may vary depending on the utility rates at the remote location. In the exemplary embodiment remote command center 112 (FIG. 1) obtains vehicle location data in any suitable manner. As discussed above, plug-in vehicle 200 may transmit location data in various forms. GPS data, for example may be used to establish a location including an address. The location data may be processed by charge control module 204 in plug-in vehicle 200 and/or controller 154 in remote command center 112.

In one embodiment the remote command center uses the location data to determine a utility company that is associated with a charging location (task 404). Remote command center, for example, may receive information from power utility control centers 110, 130, and 140 (FIG. 1) that identify service areas for each power utility company. In the exemplary embodiment the utility service areas may be plotted on a map, and the location data may also be plotted on a map to determine the utility company. Alternatively, remote command center 112 may communicate with one or more utility control center by sending location data and receiving a response that indicates which utility company supplies power at the charging location.

In the exemplary embodiment a power utility control center that supplies power at the charging location communicates with remote command center 112 (FIG. 1) to regulate charging for the purpose of managing peak loads on power grid 104. As plug-in vehicle may be charged at multiple remote locations, multiple utility companies may communicate with remote command center 112 at different times. In the exemplary embodiment remote command center 112 authorizes the charging of onboard energy storage system 202 (FIG. 2) at a first location (task 410). Authorization may take place after remote command center 112 receives direction from a utility company. In the exemplary embodiment the first remote location is associated with a first utility meter, and a first utility customer that pays for power consumed at the first meter. For example the first location may be at the plug-in vehicle owner's home, and charging may be done with electricity from the plug-in vehicle owner's home electric utility meter. In one embodiment, when remote command center 112 determines that the plug-in vehicle is charging at a home or base location, charging is authorized without debiting the vehicle account associated with the remote command center 112.

When charging at the home location, plug-in vehicle may still transmit power usage data, and remote command center 112 may receive power consumption data (task 412) to track overall power usage for feedback, and for other functions. In the exemplary embodiment remote command center 112 receives first power consumption data related to the first charge request (task 412) during the charging of the onboard energy storage system and/or after completion of charging. The first power consumption data may include time of day, electricity used, utility rates (cost per unit of electricity), surcharges, taxes, discounts, and/or credits. The consumption data may be transmitted by the plug-in vehicle and/or charger, and may also be obtained from a database or from the power utility company.

As discussed above, the vehicle account and/or profile may be updated with the first power consumption data and/or other information related to the charge at the first location (task 406). In the exemplary embodiment, controller 154 processes consumption data received from plug-in vehicle 200 (FIG. 2) and stores information related to vehicle efficiency, total power consumed, costs of operating plug-in vehicle 200, locations where the vehicle was charged, and/or other information. Controller 154 may update a user account or profile (task 406) that is stored in database 156. In one exemplary embodiment a vehicle account includes information for multiple drivers of plug-in vehicle 200, with costs and efficiency information associated with each driver.

In the exemplary embodiment remote command center 112 (FIG. 1) authorizes charging of onboard energy storage system 202 (FIG. 2) at additional locations that are remote locations such as a second location associated with a second utility meter and a second utility company (task 420), and a third location associated with a third utility meter and a third utility company (task 430). The second location, for example, may be the home of a friend located in a different city and/or state from the plug-in vehicle owner's home and state. The third location may be an office, shopping center, or other location closer to the first location. The second and third locations may have power supplied from different utility meters than the first location, and may also have a different utility company that supplies electricity and manages the power grid at the second location. In the exemplary embodiment remote command center 112 receives charge commands from the second utility company as part of authorizing the charge at the second location (task 420), and from the third utility company as part of authorizing the charge at the third location (task 430).

Charge authorizations (task 410, 420, and 430), in the exemplary embodiment can include more than a single transmission to plug-in vehicle 200 (FIG. 2). As conditions change on power grid 104 (FIG. 1) remote command center 112 may receive commands from power utility control centers 110, 130 and 140 directing changes in the charging of one or more plug-in vehicles. Then remote command center 112 sends additional charge authorizations (task 410, 420, and 430) directing the charging of onboard energy storage systems 202 according to the commands from power utility control centers.

Depending upon the system deployment, remote command center 112 (FIG. 1) can determine whether to charge the onboard energy storage system: (1) independently (i.e., based upon data obtained from the vehicle and data obtained from the power utilities control center); (2) as instructed by the power utilities control center (i.e., the remote command center may communicate with the power utilities control center and function as an intermediary for the vehicle); or (3) based upon recommendations provided by the utilities control center. This determination will influence the type of charge authorization transmitted to the plug-in vehicle (tasks 410, 420, and 430), where a charge authorization includes data, instructions, and/or control parameters that regulate charging of the onboard energy storage system of the vehicle.

In the exemplary embodiment, after plug-in vehicle 200 (FIG. 2) terminates the charging of onboard energy storage system 202, power usage information is transmitted (task 328—FIG. 3) to remote command center 112 (FIG. 1). The remote command center may receive second consumption data (task 422) related to the second charge at the second location. In the example discussed above, second location is a remote location, and the costs associated with charging onboard energy storage system 202 at second location are debited against the vehicle account, and the vehicle account is updated (task 406). Remote command center 112 may transmit information to the utility company previously identified that is associated with the charging location, to allow the utility customer account associated with the charging location to be credited. In the exemplary embodiment the vehicle location data and the power consumption data that are transmitted allow the power company to credit the power utility account associated with the meter at the second location.

In a similar manner as discussed above, remote command center may receive third consumption data (task 432) related to the third charge at the third location. Consumption data, for example, may be transmitted through a wireless communication system that is coupled to the charging system for the onboard energy storage system, such as data communication system 214 (FIG. 2). The third consumption data may be stored in the user profile and/or account associated with the plug-in vehicle owner (task 406). Charging of onboard energy storage system 202 (FIG. 2) may take place at the third location and other locations during a single billing cycle of the vehicle account. In the exemplary embodiment the costs of charging onboard energy storage system 202 in plug-in vehicle 200 at the various locations and through various utility companies during the billing cycle is billed to the owner of plug-in vehicle 200 in a single bill. The electricity used may be billed to the vehicle owner rather than the utility customer associated with the various utility meters used to charge the plug-in vehicle at different times.

A transaction between the vehicle owner and the second utility company (i.e. at the friend's house) can be transparent to the friend, even though power is supplied through the second utility meter at the friend's house. Remote command center 112 (FIG. 1) may communicate with the utility company associated with the second utility meter (i.e. the friend's house) to credit the account associated with the second utility meter for power used to charge plug-in vehicle 200 (FIG. 2).

In the exemplary embodiment the transaction of charging the onboard energy storage system 202 (FIG. 2) at a remote location involves communication between plug-in vehicle 200 and a utility company. Each utility company may have a different format for data and/or may have specific requirements for data communication related to power usage. Remote command center 112 (FIG. 1), in various embodiments, provides data communication between plug-in vehicle 200 and the utility company associated with the remote location. Remote command center 112 may also translate the data format as appropriate for each utility company so that plug-in vehicle 200 can be charged at various locations that are associated with different utility companies.

Figure 5:
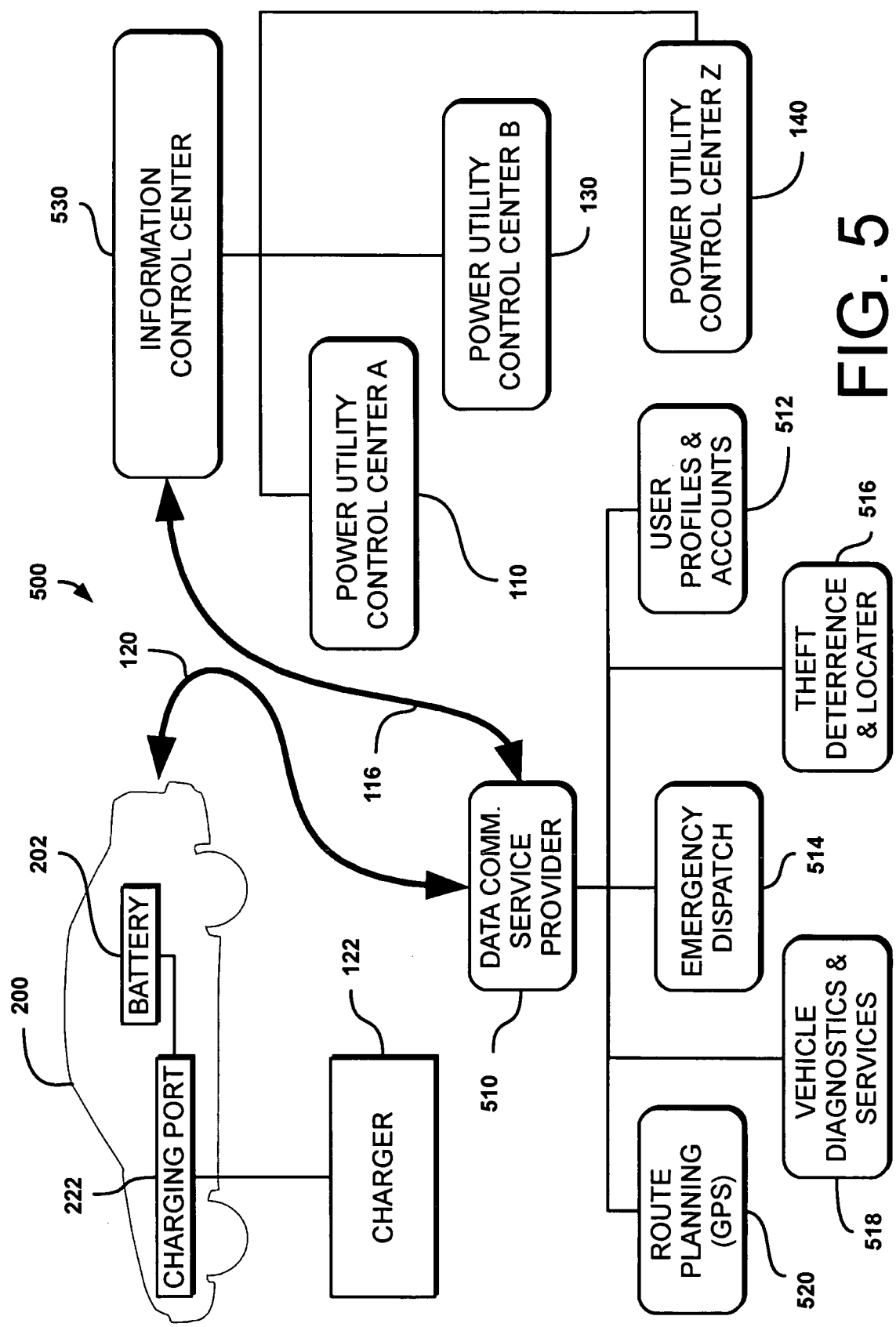
FIG. 5 is a simplified schematic diagram of an embodiment of a system for controlling the charging of onboard energy storage systems of plug-in vehicles.

FIG. 5 shows a system 500 for charging onboard energy storage system (battery) 202 in plug-in vehicle 200. System 500 suitably includes a data communication service provider 510 that communicates with plug-in vehicle 200, and an information control center 530 that communicates with power utility control centers 110, 130, and 140. In exemplary system 500 data communication service provider 510 is separate from information control center 530 and communicates with information control center through link 116. In other embodiments data communication service provider 510 and information control center 530 are incorporated together, such as remote command center 112 (FIG. 1).

In the exemplary embodiment data communication service provider 510 provides services including maintaining a user profile 512 for individual vehicles and/or users to facilitate convenient charging of vehicles at multiple locations. User profiles 512 may store information regarding power consumption, plug-in vehicle efficiency, charging schedules, preferred charging times, as well as other information as discussed above.

Data communication service provider 510 may have devices for establishing two way communications with plug-in vehicle 200, including devices to establish a data communication link 120. In the exemplary embodiment, data communication service provider 510 provides services such as crash emergency dispatch 514, vehicle theft deterrence and/or location 516, vehicle diagnostics and services 518 (such as remote unlocking of vehicle), and/or route planning 520 using GPS information received by plug-in vehicle 200 and transmitted to data communication service provider 510. Although only one vehicle is shown in FIG. 5, it is understood that data communication service provider 510 communicates with multiple vehicles in multiple locations at one time.

In exemplary system 500, data communication service provider 510 receives power consumption data related to charging onboard energy storage system 202 at a remote location. Plug-in vehicle 200 may also send SOC/SOH data and the vehicle location data to data communication service provider 510. Data communication service provider 510 then transmits information to information control center 530 for data formatting and transmission to the appropriate power utility control center, such as power utility control center A 110. In this example, power utility control center A utilizes the information to control, manage, and regulate the charging of plug-in vehicle 200 by sending communication back through information control center 530 and data communication service provider 510 to plug-in vehicle 200. Power utility control center 110 may also track power usage for billing purposes and/or other purposes. Notably, such power usage tracking can be accomplished wirelessly from the plug-in vehicles to the utility companies. The data communication between a vehicle and its host data communication service provider 510, and between data communication service provider 510 and the utility companies, may be performed in accordance with one or more wireless and/or wired data communication protocols.

In an exemplary embodiment power utility control centers 110, 130, and 140, communicate with information control center 530 and/or data communication service provider through the internet. Power utility control centers 110, 130, and 140, for example, may transmit rate schedules through the internet by posting to various websites, or in other ways. In this example the rate schedules and other information are retrieved from various websites by data communication service provider 510 and/or information control center 530. In other embodiments other methods and means of communication are used to communicate between power utility control centers 110, 130 and 140, and data communication service provider 510 and/or information control center 530.

In another embodiment information control center 530, rather than one of the power utility control centers, performs peak load management by receiving grid load information from power utility control centers and determining when to transmit charge authorization, or other commands through data communication service provider 510 to plug-in vehicle 200 to manage peak loads on the power grid.

Information control center 530 may also assist in controlling and/or determining power transfer between different power utilities on the grid based on information received from the power utilities, as well as information from charge requests received from multiple vehicles through data communication service provider 510.

Another service that may be provided by information control center 530 is tracking billing information for power consumption of individual plug-in vehicles 200. In one embodiment billing may be determined on whether the vehicle is charging at an electric utility meter associated with the vehicle owner or user, such as a home electric utility meter, or whether the vehicle is at a remote utility meter such as an office utility electric meter. A different rate or a separate roaming charge may be established for charging a vehicle at a different residence or at a public charging station such as in a public parking area. Information control center 530 may also track power that is used from onboard energy storage system for balancing peaks, and other credits associated with charging plug-in vehicle 200.

In one embodiment information control center 530 receives information regarding the production of electricity from power sources with low environmental impact, and matches power production with power consumption for charging onboard energy storage systems 202. Information control center 530 may also match lowest cost production of electricity and/or lowest cost utility rates to power used to charge onboard energy storage system 202 so that charging occurs at a lower cost to the utility company and/or the vehicle owner.

As discussed above, onboard energy storage system 202 may be used as a power back-up source for a home or business. Information control center 530 may receive information related to the state of the power grid when a power failure occurs, and transmit the information to data communication service provider 510 to assist in managing transitions between back-up power and utility power when utility power is restored. This may assist in managing an initial peak power demand when power is restored after a power outage as well as other aspects of power load management.

Information control center 530 may also provide analysis and information to utility companies and/or to vehicle owners regarding production/consumption of electricity, efficiency and other information. A key fob provided to each driver, for example may be used to track which driver is driving and therefore to track vehicle efficiency separately for each driver. Efficiency information may be transmitted through data communication service provider 510 to information control center 530 for analysis. The efficiency information and analysis may be formatted and delivered to the vehicle owner.

Figure 6:
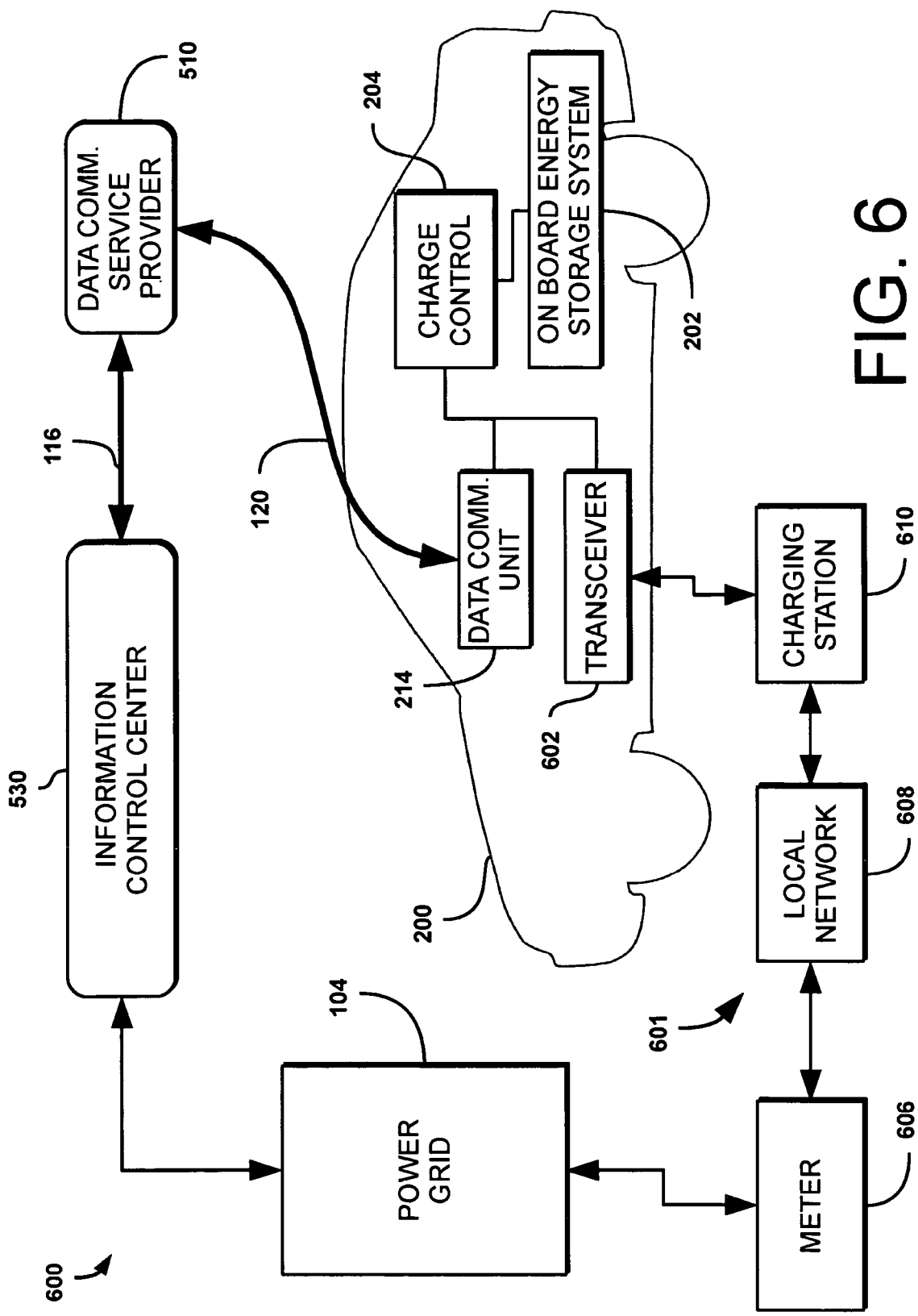
FIG. 6 is a simplified schematic diagram of an embodiment of a system for controlling the charging of onboard energy storage systems of plug-in vehicles having two communication paths.

FIG. 6 shows another embodiment of a system 600 for charging onboard energy storage system 202 having multiple communication paths between plug-in vehicle 200 and information control center 530. System 600 suitably includes an advanced meter infrastructure (AMI) communication path 601 including an advanced meter 606, a local network coupled to the advanced meter 608, and a charging station 610 coupled to the local network. AMI communication path 601 may allow plug-in vehicle 200, including a transceiver 602 to communication to a power grid 104 that supplies power for charging onboard energy storage system 202. Power grid 104 may include power utility control centers that communicate with information control center 530. Exemplary system 600 may also include a communication path between plug-in vehicle and information control center 530 through data communication service provider 510.

Communication through AMI communication path 601 may be available when plug-in vehicle 200 is charged at a location with advanced meter 606. In the exemplary embodiment advanced meter 606 provides communication of information regarding power usage by individual circuits and devices connected to power grid 104 through advanced meter 606. Advanced meter 606 may communicate with devices through any suitable means of data communication. In an exemplary embodiment a local network 608 such as a wireless communication system enables communication between advanced meter 606 and devices such as a charging station 610. Charging station 610 may communicate with transceiver 602 connected to plug-in vehicle 200. Transceiver 602, for example, may be incorporated into a charging cable or installed in plug-in vehicle 200. In the exemplary embodiment transceiver 602 communicates wirelessly with charging station 610, in other embodiments, however, communication may also be through a wired connection, such as through a charging cable connecting charging station 610 to plug-in vehicle 200. In exemplary system 600, AMI communication path 601 transmits information regarding charging of plug-in vehicle 200 between power grid architecture 104 and plug-in vehicle 200. The information may be used by a power utility company as described above, for example to balance peak loads.

The communication path through data communication service provider 510 may be used at the same time as AMI communication path 601. Data communication service provider 510, in the exemplary embodiment, communicates with plug-in vehicle 200 and verifies vehicle ID, transmits charge enable on/off messages, transmits time of use (TOU) utility rates, as well as other information. Data communication service provider 510 communicates with information control center 530 to transfer information such as vehicle ID, connection status of vehicle, connection location of vehicle, charge start and end times, power used for charging, and the present charging rate (kW). Power consumption (kWh) may also be transmitted through both AMI path 601 and data communication service provider 510 and then compared at information control center 530 to identify errors in the system.

In one embodiment charging station 610 is connected to plug-in vehicle 200 and a charge request is initiated through data communication service provider 510. Data communication service provider 510 receives information regarding charging and transmits the information to plug-in vehicle 200. The information, for example, may include an estimated cost of charging plug-in vehicle 200 according to present settings and schedule. A vehicle user may view the cost of charging onboard energy storage system 202 and modify the settings such as charge level, time of charge, rate of charge, as well as other settings. Another charge request may then be sent through data communication service provider 510 with a modified cost of charge returned. The vehicle user may accept the new charging parameters (which may be accepted by default if no action is taken, or by affirmative confirmation) or charging parameters may be further modified. The charging schedule and parameters may be stored in transceiver 602 and executed unless modified by a new charging schedule.

Power usage from charging onboard energy storage system 202 may be transmitted to information control center 530 to be formatted for use through a web interface for customers and/or the utility company supplying power. Transmitted information may include information regarding the status of the charger as well as the battery pack. Information may include the temperature of the charger, the output voltage at the charger, the output current at the charger as well as other information regarding the charger.

In the embodiment with two communication paths, some information and control of the charging process may be managed through AMI communication path 601. AMI communication path 601, for example, may be designed for specific parameters to be returned to a utility company, such as present power usage, and whether an active appliance is essential or non-essential. AMI communication path 601 may be configured by a utility company primarily to manage peak load and perform other power grid management functions. The data communication service provider 510, however, may be configured primarily to provide detailed information as well as an added level of control to the consumer and/or a utility company for managing charging of onboard energy storage systems 202. In exemplary system 600 the two communication paths work together to provide increased capabilities to manage peak loads, costs, and to provide feedback information related to charging plug-in vehicles.

The remote charging control system and methodologies described above can also be modified to give the power utility companies direct control over some aspects of the charging cycles. For example, the plug-in vehicle chargers may be external to the vehicles, and the power utilities companies may have the ability (either directly or via the remote command center) to control whether or not power is available at the chargers. In other words, the decision and switching intelligence may be implemented in the chargers rather than in the plug-in vehicles as described previously. To support this alternate system embodiment, each compatible charger is suitably configured with appropriate hardware, software, and/or firmware that enables it to communicate with the remote command center and/or the power utilities control center. Compatible chargers are also configured to respond to a received charge enable command or a received charge disable command in the manner described above in the context of onboard vehicle processing. In other words, these charge commands activate the charging and non-charging states, which are maintained by the chargers themselves. Of course, a practical embodiment may be suitably configured to support this modified charging methodology in addition to the charging methodology described in more detail above. For example, this additional feature is possible with off-board (external) chargers that would be in the range of 6.6 kW and higher. In contrast, an onboard 110 volt (1.5 kW) plug-in charger represents a completely self-contained charging system for the vehicle.

The techniques and technologies described here enable the owner of a plug-in vehicle to charge a vehicle at multiple locations without the need to establish contractual relationships with multiple utility companies or with each utility customer where the vehicle is charged. With multiple charging locations available, an electric vehicle may have a larger usable range for operating on electricity received from utility power sources.

Techniques and technologies may be described in this application in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the systems described are merely suitable examples.

For the sake of brevity, conventional techniques related to signal processing, data transmission, electric power systems, power grid management and control, vehicle data communication systems and services, and other functional aspects of the systems (and the individual operating components of the systems) may not be described in detail. Furthermore, the connecting lines shown in the various figures contained in this application are intended to represent example functional relationships and/or physical couplings between the various elements. It should be noted that many alternative or additional functional relationships or physical connections may be present in an embodiment of the subject matter.

The preceding description may refer to elements or nodes or features being "connected" or "coupled" together. As used in this application, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

System and method embodiments are described above with reference to a practical deployment of a plug-in electric vehicle. It should be appreciated that the system and method embodiments can be equivalently practiced in the context of a plug-in hybrid electric vehicle, and the scope and application of the techniques and technologies described are not limited to any particular vehicle type or configuration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A remote command center, associated with a telematics service provider, for directing the recharging and billing of a plurality of distinctly identified plug-in vehicles, the remote command center comprising:
    a communication system configured to transmit charge authorizations to recharge each of the plurality of plug-in vehicles and to receive data related to power consumption from each of the plurality of plug-in vehicles, and to receive power generation data from a utility company, wherein each of the plurality of plug-in vehicles includes a vehicle data communications system for communicating with a remote command center over a data communication network;
    a controller communicatively coupled to the communication system and configured to receive the data related to power consumption and to direct the charge authorizations based thereon, and to direct billing of user or vehicle accounts based on recharging of a corresponding vehicle, wherein directing the billing of a particular user or vehicle account includes:
        determining whether a plug-in vehicle associated with the particular user or vehicle account is being recharged at a remote location;
        billing the particular user or vehicle account for recharging costs only if the plug-in vehicle is determined as being recharged at a remote location;
        consolidating the recharging costs with telematics service-related costs for telematics services provided to the plug-in vehicle by the remote command center in a consolidated bill; and
        debiting the user or vehicle account for the consolidated costs based on the consolidated bill; and
    a database communicatively coupled to the controller, the database configured to store the data related to power consumption during particular recharging of individual vehicles of the plurality of plug-in vehicles in association with corresponding user or vehicle accounts.

2. The remote command center of claim 1 wherein the database includes data related to power companies that supply power for recharging the plurality of plug-in vehicles, and wherein the database correlates the data related to the power consumption with the data related to the power companies.

3. The remote command center of claim 1 wherein the data related to power consumption stored in the database includes data related to a location of each of the plurality of plug-in vehicles while recharging.

4. The remote command center of claim 1 wherein the communication system is configured to receive data related to operation of one of the plurality of plug-in vehicles, wherein the controller is configured to determine vehicle efficiency of the one of the plurality of plug-in vehicles using the data related to the operation of the one of the plurality of plug-in vehicles and using the data related to the power consumption, and wherein the vehicle efficiency is stored in the database and associated with the one of the plurality of plug-in vehicles.

5. The remote command center of claim 1 wherein the communication system receives data related to a charging location where one of the plurality of plug-in vehicles is connected to a power source, wherein the controller is configured to determine recharging costs from the data related to the power consumption, and wherein the recharging costs are stored in the database and associated with the charging location.

6. The remote command center of claim 5 wherein power is supplied from a utility company to charge one of the plurality of plug-in vehicles, wherein the charging location is associated with a utility power meter and a utility customer, and wherein the communication system is configured to transmit the data related to the power consumption, and data related to the utility power meter to the utility company.

7. The remote command center of claim 1 wherein the controller is configured to remotely regulate recharging of the plurality of plug-in vehicles by using charge commands transmitted by the communication system to the plurality of plug-in vehicles.

8. The remote command center of claim 1 wherein the communication system is configured to receive data related to operation of the plurality of plug-in vehicles, wherein the controller is configured to determine estimated emissions of one of the plurality of plug-in vehicles using the data related to the operation of the plurality of plug-in vehicles and the data related to the power consumption, and to store the estimated emissions in the database.

9. The remote command center of claim 1, the system comprising a user interface device communicatively coupled to the communication system and configured to accept input from a vehicle operator including parameters that modify the charge authorizations.

10. A recharging system of a plug-in vehicle configured to recharge a battery of the vehicle, the recharging system comprising:
   a sensor configured to sense electric power received from a utility power source used to recharge the battery;
   a data storage device communicatively coupled to the sensor, the data storage device configured to store data related to the electric power and user or vehicle account information; and
   a data communication system communicatively coupled to the data storage device and configured to transmit a charge authorization request to a remote command center, to send user or vehicle account information to the remote command center, transmit the data related to the electric power to the remote command center, and to receive power generation data from a utility company associated with the utility power source, wherein the user or vehicle account information is utilized by the remote command center for charge authorization and billing associated with recharging of the vehicle;
   a positioning system, configured to determine whether a location where the plug-in vehicle is being recharged is a remote location, wherein the user or vehicle account is billed by the remote command center for recharging costs only if the plug-in vehicle is determined as being recharged at a remote location, with the user or vehicle account being billed using a consolidated bill that that consolidates the recharging costs with telematics service-related costs for telematics services provided to the plug-in vehicle by the remote command center.

11. The charging system of claim 10, wherein the data storage device stores a charging profile that provides rules for recharging the battery.

12. The charging system of claim 11, the charging system comprising a user interface device communicatively coupled to the communication system and configured to accept input from a vehicle operator modifying the rules for recharging the battery.

13. A method of charging a plurality of onboard energy storage systems of a plurality of plug-in vehicles, the method comprising:
   transmitting, by a remote command center, charge authorizations to recharge the plurality of onboard energy storage systems;
   receiving, by the remote command center, from the plurality of plug-in vehicles, data related to power consumption during the recharging of each of the plurality of onboard energy storage systems according to the charge authorizations and user or vehicle account data;
   receiving, by the remote command center, power generation data from one or more utility companies;
   determining, by the remote command center, whether a plug-in vehicle is being recharged at a remote location or a home location;
   determining, by the remote command center, an amount to bill a user or vehicle account associated with the plug-in vehicle for recharging costs only if the corresponding plug-in vehicle is determined as recharged at a remote location; and
   consolidating, by the remote command center, the recharging costs with telematics service-related costs for telematics services provided to the plug-in vehicle by the remote command center in a consolidated bill; and
   debiting, by the remote command center, the user or vehicle account for the consolidated costs based on the consolidated bill.

14. The method according to claim 13 further comprising:
   determining a cost of the power consumption from recharging one of the plurality of onboard energy storage systems; and storing the cost of the power consumption.

15. The method according to claim 13 further comprising:
   associating the data related to the power consumption from recharging one of the plurality of onboard energy storage systems with a user account.

16. The method according to claim 13 further comprising: receiving data related to a location of one of the plurality of plug-in vehicles; and correlating the location to a utility company.

17. The method according to claim 16 further comprising:
   receiving, from the utility company, a charge command; and
   regulating the recharging of one of the plurality of onboard energy storage systems according to the charge command received from the utility company.

18. The remote command center according to claim 1, wherein before debiting a particular user account, the controller is further configured to determine which user, out of multiple users associated with the plug-in vehicle being charged, requested recharging of the plug-in vehicle.

19. The remote command center according to claim 1, wherein the communication system is further configured to communicate with multiple utility companies, including receiving billing rate information regarding the multiple utility companies' respective billing rates for recharging at various charging locations; and wherein directing the billing of the particular user or vehicle account by the controller is based on the received billing rate information and further includes: combining recharging costs corresponding to recharging provided by multiple utility companies corresponding to the particular user or vehicle account.

\* \* \* \* \*